US012707206B2

(12) United States Patent
Lisle et al.

(10) Patent No.: US 12,707,206 B2
(45) Date of Patent: Aug. 11, 2026

(54) MULTILAYERED ELECTROSTATIC TRANSDUCER

(71) Applicant: Warwick Acoustics Limited, Nuneaton (GB)

(72) Inventors: Benjamin Martin Lisle, Swadlincote (GB); James Hedges, Derby (GB); Samuel John Evans, Nuneaton (GB); Ashley Marriott, Leicester (GB)

(73) Assignee: Warwick Acoustics Ltd., Nuneaton (GB)

( * ) Notice: Subject to any disclaimer, the term of this patent is extended or adjusted under 35 U.S.C. 154(b) by 119 days.

(21) Appl. No.: 18/690,575

(22) PCT Filed: Sep. 21, 2022

(86) PCT No.: PCT/GB2022/052382

§ 371 (c)(1),
(2) Date: Mar. 8, 2024

(87) PCT Pub. No.: WO2023/047097

PCT Pub. Date: Mar. 30, 2023

(65) Prior Publication Data

US 2024/0381036 A1 Nov. 14, 2024

(30) Foreign Application Priority Data

Sep. 21, 2021 (GB) .................................... 2113468

(51) Int. Cl.

*H04R 19/02* (2006.01)
*H04R 7/06* (2006.01)
*H04R 7/16* (2006.01)

(52) U.S. Cl.

CPC ............... *H04R 19/02* (2013.01); *H04R 7/06* (2013.01); *H04R 7/16* (2013.01)

(58) Field of Classification Search

CPC ............. H04R 19/02; H04R 7/06; H04R 7/16
See application file for complete search history.

(56) References Cited

U.S. PATENT DOCUMENTS 3,654,403 A 4/1972 Bobb
3,821,490 A 6/1974 Bobb
(Continued)

FOREIGN PATENT DOCUMENTS

CN 1205829 A 1/1999
CN 209642967 U 11/2019
(Continued)

OTHER PUBLICATIONS

Examination Report issued in Indian Patent Application No. 202417031396 on Jan. 29, 2026, 6 pages.
(Continued)

*Primary Examiner* — Suhan Ni
(74) *Attorney, Agent, or Firm* — McDonnell Boehnen Hulbert & Berghoff LLP

(57) ABSTRACT

An electrostatic transducer includes first and second flexible conductive membranes; and first and second conductive stators. The membranes and the stators are assembled in a layered configuration with the membranes between the stators and with an enclosed volume of air sealed between the first and second membranes. The electrostatic transducer is arranged in use to apply an electrical potential which gives rise to an electrostatic force between the membranes and the stators that causes the membranes to move relative to the stators.

8 Claims, 8 Drawing Sheets

(56) References Cited

U.S. PATENT DOCUMENTS

| | | | | |
|---|---|---|---|---|
| 3,941,946 | A | 3/1976 | Kawakami et al. | |
| 4,160,882 | A | 7/1979 | Driver | |
| 5,392,358 | A | 2/1995 | Driver | |
| 5,851,336 | A | 12/1998 | Cundiff et al. | |
| 6,535,460 | B2 | 3/2003 | Loeppert et al. | |
| 6,804,362 | B1 | 10/2004 | Zimmermann et al. | |
| 9,031,266 | B2 | 5/2015 | Dehe et al. | |
| 9,667,173 | B1 | 5/2017 | Kappus et al. | |
| 2008/0279398 | A1 | 11/2008 | Jansen | |
| 2010/0135519 | A1 | 6/2010 | Werners et al. | |
| 2011/0255721 | A1 | 10/2011 | Chen et al. | |
| 2012/0051564 | A1 | 3/2012 | Liou et al. | |
| 2012/0148071 | A1 | 6/2012 | Dehe | |
| 2013/0108086 | A1 * | 5/2013 | Yamashita | H04R 19/02 381/191 |
| 2015/0071468 | A1 | 3/2015 | Chiang et al. | |
| 2016/0112803 | A1 | 4/2016 | Scheben | |
| 2021/0139319 | A1 | 5/2021 | Klein et al. | |

FOREIGN PATENT DOCUMENTS

| | | | |
|---|---|---|---|
| GB | 1262505 | A | 2/1972 |
| JP | 50-90320 | A | 7/1975 |
| KR | 10-1987111 | B1 | 6/2019 |
| TW | 201419880 | A | 5/2014 |
| WO | 97/24013 | A1 | 7/1997 |
| WO | 00/01194 | A2 | 1/2000 |
| WO | 00/01195 | A2 | 1/2000 |
| WO | 2006/088279 | A1 | 8/2006 |

OTHER PUBLICATIONS

Examination Report issued in Indian Patent Application No. 202417031397 on Jan. 30, 2026, 6 pages.
Communication pursuant to Article 94(3) issued in European Patent Application No. 22 782 939.7 on Jan. 23, 2026, 8 pages.
International Search Report issued in Int'l Application No. PCT/GB2022/052382, mailed Jan. 2, 2023, 4 pages.
Written Opinion issued in Int'l Application No. PCT/GB2022/052382, mailed Jan. 2, 2023, 9 pages.

* cited by examiner

MULTILAYERED ELECTROSTATIC TRANSDUCER

CROSS REFERENCE TO RELATED APPLICATIONS

The present application is a § 371 national stage of international application no. PCT/GB2022/052382, filed on Sep. 21, 2022, which claims priority to UK application no. 2113468.9, filed on Sep. 21, 2021, the disclosures of both of which are incorporated by reference in their entirety herein.

FIELD

This invention relates to an electrostatic transducer and is particularly but not exclusively concerned with a loudspeaker suitable for reproducing audio signals.

BACKGROUND

A traditional electrostatic loudspeaker comprises a conductive membrane disposed between two perforated conductive backplates to form a capacitor. A D.C. bias is applied to the membrane and an A.C. signal voltage is applied to the two backplates. The signals cause an electrostatic force to be exerted on the charged membrane, which moves to drive the air on either side of it.

Variations on such traditional electrostatic loudspeakers are known. For example, an electrostatic transducer may be provided with two membranes. Such arrangements may provide some advantages in relation to the performance of the transducer, such as increased sound pressure level (SPL). However, there remains a need for improvement in the acoustic performance of electrostatic transducers of this type.

SUMMARY

When viewed from a first aspect, the invention provides an electrostatic transducer comprising:

first and second flexible conductive membranes; and first and second conductive stators;

wherein the membranes and the stators are assembled in a layered configuration with the membranes between the stators;

wherein the electrostatic transducer is arranged in use to apply an electrical potential which gives rise to an electrostatic force between the membranes and the stators that causes the membranes to move relative to the stators; and wherein the first and second flexible conductive membranes have respective first and second effective compliances, wherein the first effective compliance is at least 10% greater than the second effective compliance.

The first aspect of the invention extends to a method of manufacturing an electrostatic transducer, the method comprising:

providing first and second flexible conductive membranes; and first and second conductive stators;

assembling the first and second flexible conductive membranes and the first and second stators in a layered configuration with the membranes between the stators; and arranging the electrostatic transducer to apply in use an electrical potential which gives rise to an electrostatic force between the membranes and the stators that causes the membranes to move relative to the stators;

wherein the first and second flexible conductive membranes, after assembly in the layered configuration, have respective first and second effective compliances, wherein the first effective compliance is at least 10% greater than the second effective compliance.

As is understood by the skilled person, "compliance" is a term of the art which refers to the inverse of a material's stiffness, i.e. the compliance refers to the extension in a material produced per unit force applied to the material. When the material (i.e. the membrane in this case) is held under tension, the tension affects the extension produced per unit force. As is also understood by the skilled person, an effective compliance may then be defined, which takes into account the tension under which the material is held. It is therefore to be understood that the term "effective compliance" as used herein refers to the effective compliance which takes into account the tension in the membrane when the membrane is mounted in the layered configuration. As such, the effective compliance of each membrane is defined for the respective membrane (with its respective tension) when it is assembled in the layered configuration in the transducer.

As the skilled person will also appreciate, the compliance of a material (and thus the effective compliance of a material held under tension) is not necessarily isotropic, e.g. the compliance and effective compliance may be anisotropic (e.g. orthotropic). In general, the compliance and effective compliance may each be expressed as a tensor. In the context of the present invention, when it is said that the effective compliance of the first membrane is at least 10% (or any other specified percentage) greater than the effective compliance of the second membrane, where applicable this may be understood to mean that each non-zero component in the effective compliance tensor of the first membrane is greater than the corresponding component in the effective compliance tensor of the second membrane by at least the specified percentage.

Generally, providing two membranes in a layered configuration in a transducer can provide some advantages. For example, providing a second membrane in an electrostatic transducer can increase the output of the transducer, i.e. increasing the SPL (sound pressure level) for a given input voltage. However, the Applicant has noted that this configuration may introduce distortion (specifically intermodulation distortion resulting from two membranes resonating together) and that improvements to the frequency response would be beneficial.

The Applicant has appreciated that providing the membranes with different effective compliances may mitigate or eliminate the problem with intermodulation distortion as well as further improving the performance of the transducer. A single membrane in a transducer has a characteristic frequency response that depends on the membrane's effective compliance. An illustrative sketch of the typical frequency response of a transducer with a single membrane is shown in FIG. 1. It can be seen that the amplitude of vibration increases with frequency to a resonant peak 104, then decreases after the peak, and then increases monotonically at higher frequencies. A different effective compliance provides a different frequency response, e.g. changing the position of the resonant peak.

Providing a second membrane with a different effective compliance provides an additional contribution to the frequency response, where the additional contribution has a different shape, e.g. a different resonant peak. The frequency response of the transducer as a whole is thus a composite frequency response combining the frequency responses of the two membranes. When the difference in compliance is sufficiently large, i.e. at least 10%, the composite frequency response has beneficially improved characteristics. For example, the contribution of two different resonant peaks may provide a flatter frequency response compared with a single membrane or compared with two membranes that have the same effective compliance. This may advantageously mitigate the effects of distortion that may result from providing two membranes, while still providing the benefits of increased SPL as discussed above.

It will be appreciated by the skilled person in light of the disclosure above that the difference in effective compliance, i.e. at least 10%, is significantly greater than the difference that would arise due to manufacturing tolerances in a transducer with two membranes. The difference between a nominal effective compliance and the actual effective compliance of a membrane that might arise due to manufacturing tolerances (e.g. in the membrane dimensions and/or the membrane tension) would be no more than 1%-2%. The difference in effective compliance is therefore one which is provided deliberately rather than one which might arise inadvertently.

In a set of embodiments, the first effective compliance is at least 15% greater than the second effective compliance, e.g. at least 20%, at least 25% or at least 30%.

The difference between the first effective compliance and the second effective compliance may be achieved in any suitable manner, e.g. through different membrane materials and/or membrane material properties; through different membrane thicknesses; through different membrane tensions; through other membrane properties or dimensions; or through a combination of two or more of these.

The first and second membranes may have different thicknesses. The first effective compliance may be greater than the second effective compliance entirely or in part as a result of the first and second membranes having different thicknesses.

The thickness of the second membrane may be at least 3% greater than the thickness of the first membrane, e.g. at least 5% greater, e.g. at least 10% greater.

The thickness of the first membrane may be less than 100 μm, e.g. less than 50 μm, e.g. less than 20 μm, e.g. less than 10 μm. The thickness of the first membrane may be greater than 5 μm, e.g. greater than 10 μm, e.g. greater than 20 μm.

The difference in thickness required to create a specified difference in effective compliance (e.g. a 10% difference in effective compliance) may depend on the properties of the membrane, e.g. the membrane material. However, in light of the teaching of the present disclosure, it is possible for the skilled person to select suitable thicknesses to achieve a specified difference in compliance.

The thickness may refer to an average thickness, a minimum thickness or a maximum thickness.

Additionally or alternatively, first and second membranes may be mounted in the transducer under different tensile stresses. For example, each membrane may be placed under a different tension during manufacture. The first effective compliance may be greater than the second effective compliance entirely or in part as a result of the first and second membranes being under different tensile stresses when mounted in the transducer.

The membranes may be placed under different tensions during manufacture of the transducer. For example, the first and second membranes may be bonded to the first and second stators respectively and/or to the spacer or spacer structure while the under different tensions, thereby introducing different tensile stresses to the first and second membranes.

The tensile stress of the second membrane may be at least 5% greater than the tensile stress of the first membrane e.g. at least 10% greater, e.g. at least 15% greater, at least 20% greater, e.g. at least 25% greater.

The tensile stress of the first membrane may be in the range 2 MPa to 50 MPa, e.g. 5 MPa to 30 MPa, e.g. 10 MPa to 20 MPa. As used herein, "tensile stress" refers to the average tensile stress in a membrane.

In one non-limiting example embodiment, a transducer has first and second membranes made from 50 μm-thick BOPP (biaxially-oriented polypropylene), wherein the first membrane has an average tensile stress of 20 MPa and the second membrane has an average tensile stress of 24 MPa.

Additionally or alternatively, first and second membranes may be made from different materials. The first effective compliance may be greater than the second effective compliance entirely or in part as a result of the first and second membranes being made from different materials.

In one non-limiting example embodiment, the first membrane is made from BOPP and the second membrane is made from BoPET (biaxially-oriented polyethylene terephthalate), and the first and second membranes have the same thickness and the same tensile stress. This may provide a difference in effective compliance of around 32%, depending on the grade of the materials.

In a set of embodiments, each membrane comprises a laminated structure, e.g. comprising flexible insulating layers and a conductive layer. For example, each membrane may comprise a flexible insulating layer (e.g. a polymer material) with a conductive (e.g. metal) layer on one side thereof, with a further flexible insulating layer (e.g. the same or a different polymer material) provided over (e.g. bonded to) the conductive layer. As one specific non-limiting example, each membrane may comprise a BOPP layer with a gold or aluminium metal coating deposited thereon, and a further BOPP layer overlaid on and bonded to the metal coating with an adhesive.

However, this is not essential and in a set of possible embodiments, each membrane comprises or consists of a layer of flexible insulating material (e.g. a polymer) with a conductive layer (e.g. a deposited metal coating) on one side thereof (e.g. on the side of the membrane facing away from the other membrane when mounted in the transducer) without an additional flexible insulating layer overlaid on and bonded to the conductive layer. As one specific non-limiting example, each membrane may be made from a sheet of BOPP with a conductive layer (e.g. a thin gold or aluminium deposited coating) on one side.

Preferably, other than the parameter(s) and/or property/properties that are specified as being different for each membrane, any other parameters relating to the membrane properties, material and mounting are identical to within manufacturing tolerances. As noted above, more than one parameter or property may be different between the membranes, e.g. the membranes could be a different thickness and have a different tensile stress such that the specified difference in effective compliance is achieved. In preferred embodiments, only one parameter/property selected from thickness, material and tensile stress differs between the membranes. It follows that in any given embodiment, the first and second membranes may have the same thickness. Similarly, the first and second membranes may be made from the same material or the same combination or materials. Similarly, the first and second membranes may be mounted in the transducer under the same tensile stress.

As noted above, having two membranes with a gap between them may improve the transducer performance. In a set of embodiments, the first and second membranes are mounted in the transducer with a gap between them.

However, the Applicant has appreciated that particular benefits and improvements in the performance of the transducer may be achieved if an enclosed volume of air is provided between the first and second membranes. For example, such an enclosed volume may provide an air cushion that provides acoustic impedance, damping the membrane at high frequencies and providing a greater effective mass at low frequencies. This may enhance the lower frequencies and flatten the higher frequencies, providing a flatter frequency response overall. In a set of embodiments, the transducer comprises an enclosed volume of air sealed between the first and second membranes.

This is novel and inventive in its own right, and thus when viewed from a second aspect, the invention provides an electrostatic transducer comprising:

first and second flexible conductive membranes; and
first and second conductive stators;
wherein the membranes and the stators are assembled in a layered configuration with the membranes between the stators and with an enclosed volume of air sealed between the first and second membranes;
wherein the electrostatic transducer is arranged in use to apply an electrical potential which gives rise to an electrostatic force between the membranes and the stators that causes the membranes to move relative to the stators.

The second aspect of the invention extends to a method of manufacturing an electrostatic transducer, the method comprising:

providing first and second flexible conductive membranes; and first and second conductive stators;
assembling the first and second flexible conductive membranes and the first and second stators in a layered configuration with the membranes between the stators and with an enclosed volume of air sealed between the first and second membranes; and
arranging the electrostatic transducer to apply in use an electrical potential which gives rise to an electrostatic force between the membranes and the stators that causes the membranes to move relative to the stators.

Optional features of the first aspect where applicable may also be features of the second aspect and vice versa.

When it is said that the volume of air sealed between the first and second membranes is "enclosed", it is to be understood that this means that the air is surrounded on all sides without any gaps. For example, the skilled person will understand that thin films may permit the passage of gases therethrough, and so it is to be understood that the enclosed volume of air is not necessarily hermetically sealed in between the first and second membranes. Rather, being "enclosed" implies that air cannot move freely in or out of the volume in a way that transmits an acoustic wave. A vent hole (e.g. provided for static equalization) is typically not necessary, and preferably no vent hole is provided.

The first and second membrane may be mounted in the transducer with spacer or spacer structure between them. The first and second membrane together with the spacer or spacer structure may enclose the volume of air. For example, the spacer or spacer structure may be bonded to the first and second membranes, e.g. around a respective periphery of each membrane, to seal the air inside the enclosed volume. Additional spacers or spacer structures may be used to separate the first and second membranes respectively from the first and second stators. The spacing between the first membrane and the first stator may have any suitable value, e.g. between 15 μm and 3 mm, e.g. between 0.1 mm and 1 mm, e.g. about 0.5 mm. The spacing between the second membrane and the second stator may have any suitable value, e.g. between 15 μm and 3 mm, e.g. between 0.1 mm and 1 mm, e.g. about 0.5 mm.

The transducer may have multiple volumes of air sealed between the membranes. In one example embodiment, the spacer comprises a layer of material with multiple large apertures separated by walls and the membranes are each bonded to the walls between the apertures. Each aperture may thus define a volume of air that is sealed in by the membranes. For example, the spacer may have a lattice shape (e.g. a hexagonal lattice or square lattice).

The spacing between the first and second membranes may have any suitable value. In general, the spacing may be selected based on the application of the transducer, e.g. to provide greater SPL, or to enhance the lower frequencies. The spacing may be less than 5 mm, e.g. less than 2 mm. As discussed herein, the spacing between the membranes refers to the spacing when the membranes are in an undeflected position. The term spacing may refer to the perpendicular distance between respective centre points on the membranes.

In a set of embodiments, there is no intervening element between the first and second membranes, i.e. there is only an air gap between the membranes. The spacing between the first and second membranes may be at least 5 μm, e.g. at least 50 μm, e.g. at least 100 μm. This is helpful to provide a sufficient air cushion between the membranes to provide the above-mentioned benefits to the transducer performance.

In general, the first and second membranes may be electrically coupled, but this is not essential. In embodiments with no intervening element between the first and second membranes, preferably the first and second membranes are electrically coupled.

In general, the transducer may be electrically biased in any suitable manner to cause the membranes to move in response to a varying voltage representing an audio signal. Preferably the electrostatic transducer comprises a biasing arrangement configured to apply the electrical potential. As a non-limiting example, in embodiments with no intervening element between the first and second membranes, a D.C. bias Vb may be applied to the first and second membranes with a varying voltage applied to the first and second stators (e.g. a voltage $V1+V(t)$ may be applied to the first stator, where V1 is a bias offset, $V1<Vb$, and V(t) is a varying voltage corresponding to the audio signal, and a voltage $V2-V(t)$ may be applied to the second stator, where V2 is a bias offset and $V2<Vb$).

In a set of embodiments, a further conductive stator is provided between the first and second membranes. In such embodiments, the spacing between the first and second membranes is preferably at least 20 μm, e.g. at least 50 μm. The further stator preferably comprises perforations, allowing air to pass therethrough. In embodiments comprising an enclosed volume of air sealed between the membranes, said volume of air may therefore contain the further stator. The further stator may be separated from each of the first and second membranes by respective first and second spacers. The first and second spacers may be bonded to the further stator and the first and second membranes (e.g. around the periphery of the further stator and of each membrane) so that the membranes, the first and second spacers and the bonded portion of the further stator together enclose the volume of air.

The first and second stators preferably comprise perforations, allowing air to pass therethrough. The first stator, the second stator and/or (where provided) the further stator may comprise an insulating coating on one or more surfaces facing the membranes.

In embodiments with a further conductive stator between the first and second membranes, the membranes may be electrically coupled, but they are preferably electrically insulated from each other.

As mentioned above, the transducer may be electrically biased in any suitable manner. As a non-limiting example, in embodiments with a further conductive stator between the first and second membranes, the first membrane, the further stator, and the second membrane may be provided with respective D.C. biases Va, Vb, and Vc (e.g. where Va<Vb<Vc) with a varying voltage applied to the first and second stators (e.g. a voltage V1+V(t) may be applied to the first stator, where V1 is a bias offset, V1<Va, and V(t) is a varying voltage corresponding to the audio signal, and a voltage V2−V(t) may be applied to the second stator, V2 is a bias offset and V2>Vc).

In some embodiments, the transducer comprises more than two membranes. In addition to the first and second membranes, there may be one or more further membranes between the first and second stators. For example, the transducer may comprise or consist of the first and second stators with three or more membranes (including the first and second membranes) between the first and second stators. Such configurations may be electrically biased in any suitable way. For example, the membranes may all be electrically coupled to each other and a D.C. bias may be applied to all of the membranes between the stators, with a varying voltage applied to the first and second stators, i.e. in a similar arrangement to that described above for the version with two membranes, but with more than two membranes all electrically coupled.

As noted above, in a set of embodiments, the transducer may comprise a further (i.e. a third) stator between the first and second membranes. In a subset of these embodiments, the transducer may comprise more than three stators and more than two membranes. For example, the transducer may comprise a number, N, of stators, and a number, N−1, of membranes, where N is at least 4. The stators and membranes may be arranged in an alternating layered configuration with the first and second stators outermost. Such arrangements may be electrically biased in any suitable manner. In one non-limiting example of a biasing arrangement, a varying voltage may be applied to each stator and a D.C. bias applied to each membrane. The varying voltage applied to the Nth stator (numbered sequentially across the transducer) includes a bias offset of N times a voltage Vb. This allows a large voltage to be provided across the transducer as a whole (thus improving output power and SPL) while keeping the voltage across any given pair of stators sufficiently below their breakdown voltage. The magnitude of the voltage swing of the varying component is the same for each stator but the polarity of the varying component for odd numbered stators is opposite the polarity for even numbered stators. The magnitude of the D.C. voltage applied to each membrane is the same but the polarity for odd numbered membranes is opposite the polarity for even numbered membranes. However, this is just one example and other biasing arrangements are possible.

BRIEF DESCRIPTION OF THE FIGURES

Certain preferred embodiments will now be described, by way of example only, with reference to the accompanying drawings, in which.

DETAILED DESCRIPTION

Figure 1:
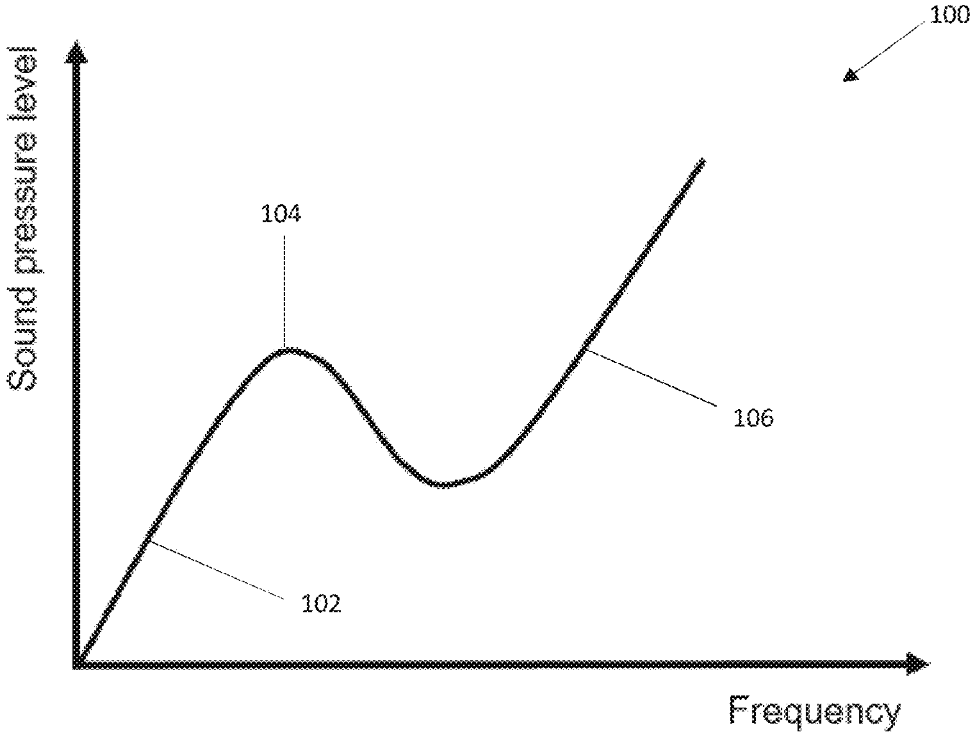
FIG. 1 shows an illustrative sketch of the frequency response of a typical electrostatic transducer having a single membrane, for reference purposes.

FIG. 1 shows an illustrative sketch of the frequency response 100 of a typical electrostatic transducer having a single membrane, for reference purposes. It can be seen that the low frequency portion 102 of the frequency response produces relatively low SPL (sound pressure level). The SPL has a resonant peak 104 at higher frequencies, and then the highest frequency portion 106 increases with increasing frequency thereafter. This frequency response is not ideal, in particular due to the poor response at low frequencies and the disproportionately strong response at the resonant peak. A flatter frequency response profile with a stronger low frequency response is desirable to improve the fidelity of the output acoustic waves based on an input audio signal.

Figure 2A:
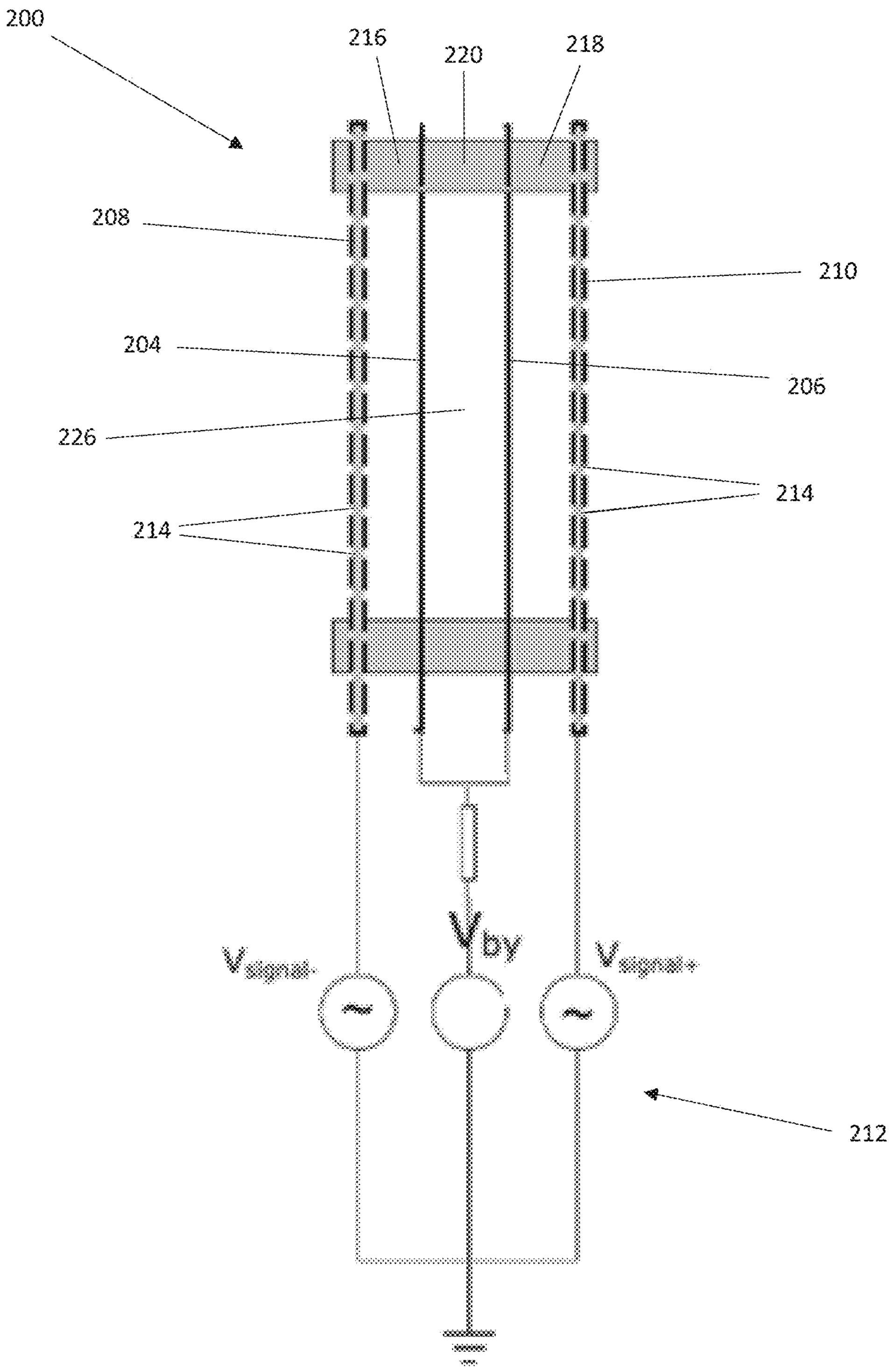
FIG. 2*a* shows a schematic cross-sectional view of a first embodiment of electrostatic transducer in accordance with the present invention.
Figure 2B:
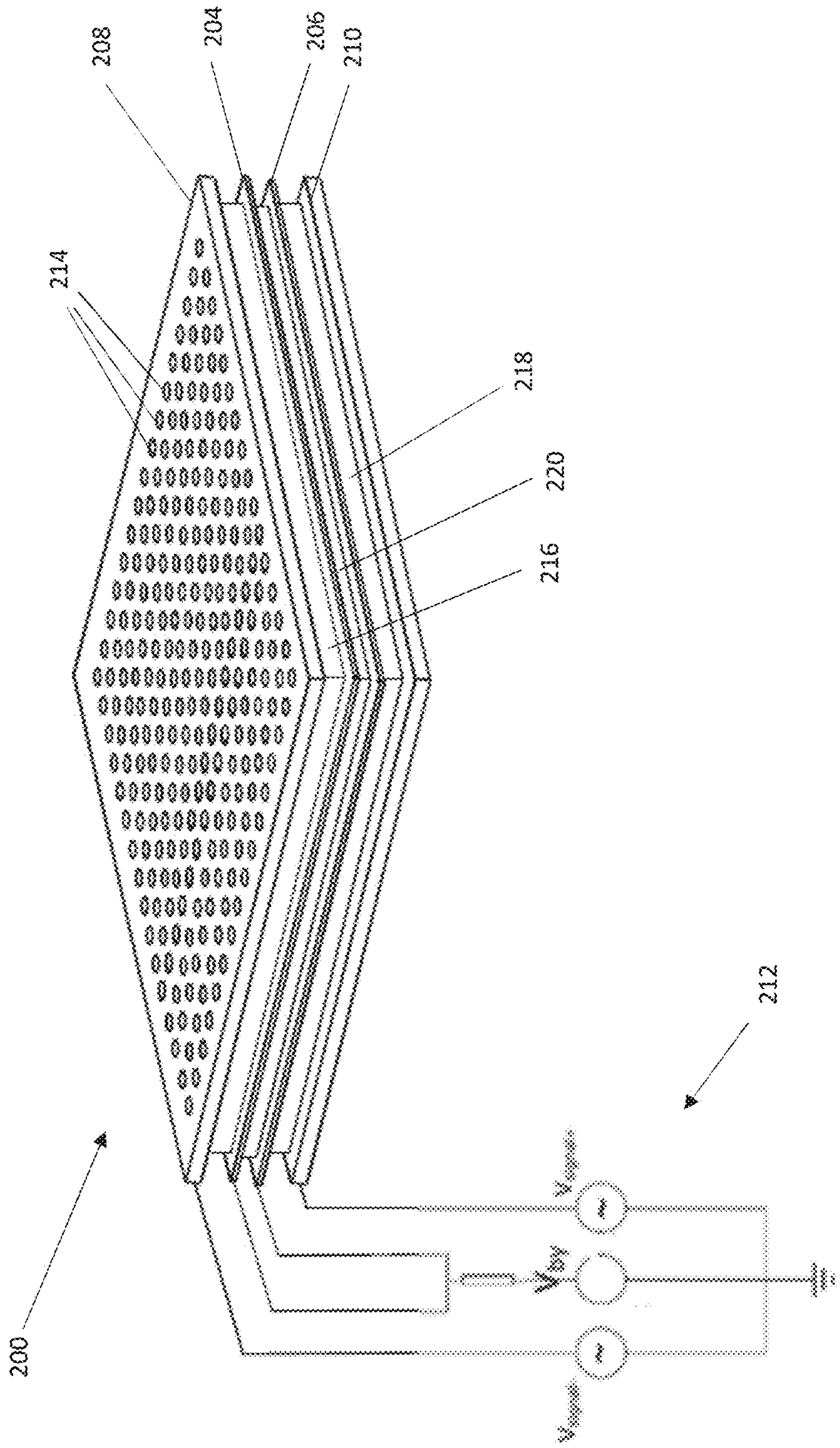
FIG. 2*b* shows a schematic perspective view of the embodiment shown in FIG. 2*a;*

FIGS. 2*a* and 2*b* show a first embodiment of an electrostatic transducer 200 in accordance with the present invention. The electrostatic transducer 200 comprises a layered configuration of membranes 204, 206 and stators 208, 210, together with a biasing arrangement 212. FIG. 2*a* shows a schematic cross-sectional view of the layered configuration. FIG. 2*b* shows a schematic perspective view of the layered configuration. FIGS. 2*a* and 2*b* are not to scale.

The layered configuration comprises a first membrane 204 and a second membrane 206, which are positioned between a first stator 208 and a second stator 210. The first and second membranes 204, 206 each comprise a flexible electrically conductive layer. The first and second stators 208, 210 each comprise a rigid conductive sheet (an aluminium sheet in this example) with an array of holes 214 therein to allow the acoustic waves generated by the membranes 204, 206 to pass through the stators 208, 210 into the surrounding environment. In other embodiments, the stators 208, 210 may comprise different materials or combinations of materials.

The transducer 200 also comprises first and second spacers 216, 218. The first spacer 216 is positioned between the first membrane 204 and the first stator 208 so that the first membrane 204 and the first stator 206 are held in a spaced relationship with respect to one another. The first membrane 204 and the first stator 208 are bonded to the first spacer 216 with an adhesive. The second spacer 218 is positioned between and bonded to the second membrane 206 and the second stator 210 in a similar manner, so that the second membrane 206 and the second stator 210 are held in a spaced relationship with respect to one another.

In this example, the spacing between the first membrane 204 and the first stator 208 is 1 mm and the spacing between the second membrane 206 and the second stator 208 is also 1 mm, although other spacings are possible.

Figure 2C:
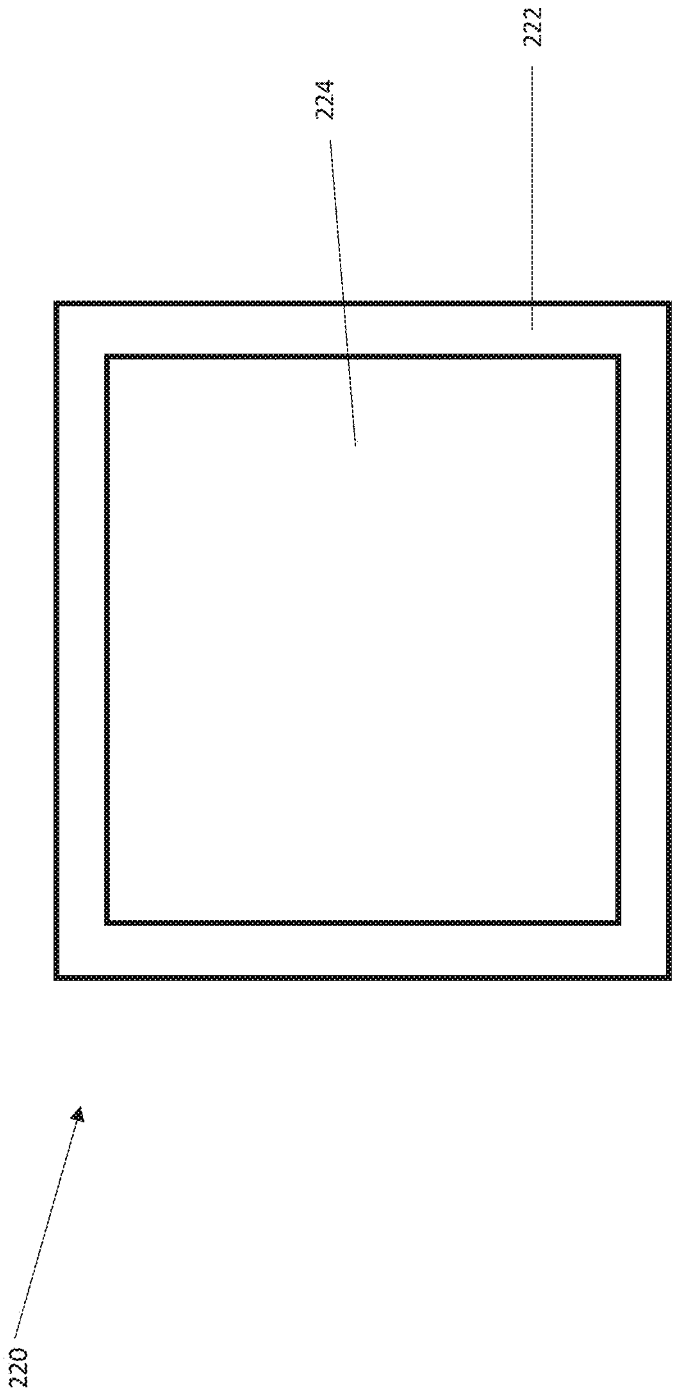
FIG. 2*c* shows a plan view of the third spacer of the first embodiment.

The transducer 200 further comprises third spacer 220 positioned between the first and second membranes 204, 206. FIG. 2*c* shows a plan view of the third spacer 220. It can be seen that in this example the third spacer 220 has a square shape (although other shapes are possible), and consists of an unbroken surround 222 that encloses a central hole 224 on four sides. The position of the third spacer 220 between the first and second membranes 204, 206 can also be seen in FIG. 2*b*. The third spacer 220 is bonded to the membranes 204, 206 around their entire peripheries, so that the surround 222 together with the membranes 204, 206 form a complete enclosure enclosing a volume of air 226 in the hole 224, with no gaps in the enclosure. The unbroken surround 222 may be formed from more than one piece, but such pieces are bonded or otherwise sealed together without gaps or air holes. As discussed above and further below, providing an enclosed volume of air between the two membranes improves the performance of the transducer—in particular, the frequency response.

In this example, the spacing between the membranes is 0.5 mm, although other spacings are possible.

The first and second membranes 204 each have a respective effective compliance. As mentioned above, the effective compliance may depend on a number of factors relating to the membrane structure, dimensions and/or materials and well as the manner in which it is mounted. In the example embodiment of FIGS. 2*a* and 2*b*, the membranes 204, 206 are identical in structure, material and dimensions. In this example, each membrane is 50 μm thick and comprises a BOPP polymer sheet with an aluminium coating deposited thereon, and a further layer of BOPP adhered over the aluminium layer. In other embodiments, the membranes may comprise different materials or combinations of materials from this particular example and/or from each other, e.g. in variation on FIGS. 2*a* and 2*b*, the membranes 204, 206 may each consist of a single BOPP sheet with an aluminium coating on one side.

To provide a difference in effective compliance, the two membranes are mounted so that each membrane is under different average tensile stress across its surface. The first membrane 204 has an average tensile stress across its surface of 20 MPa, while the second membrane 206 has an average tensile stress across its surface of 24 MPa.

In a variation on the embodiment of FIGS. 2*a* and 2*b*, the first and second membranes 204, 206 are made from the same materials and are mounted in the layered configuration under the same tensile stress but have different thicknesses. In this variation, the first membrane 204 has a thickness of 50 μm and the second membrane 206 has a thickness of 53 μm. Owing to the difference in thickness, the effective compliance of the first membrane 204 is approximately 20% higher than the effective compliance of the second membrane 206.

In the example embodiment of FIGS. 2*a* and 2*b*, the first and second membranes 204, 206 are electrically coupled and the biasing arrangement 212 provides a D.C. bias Vb to the membranes 204, 206. The biasing arrangement 212 also provides a varying voltage to the first and second stators 208, 210. The voltage provided to each stator 208, 210 includes a bias offset (V1 for the first stator 208 and V2 for the second stator 210) and a varying component V(t) corresponding to the audio signal to be reproduced. The varying component has opposite polarity for each stator 208, 210, so that as the voltage V(t) varies, the stators 208, 210 cooperate to push and pull the biased membranes 204, 206 to generate acoustic waves corresponding to the audio signal.

Figure 3A:
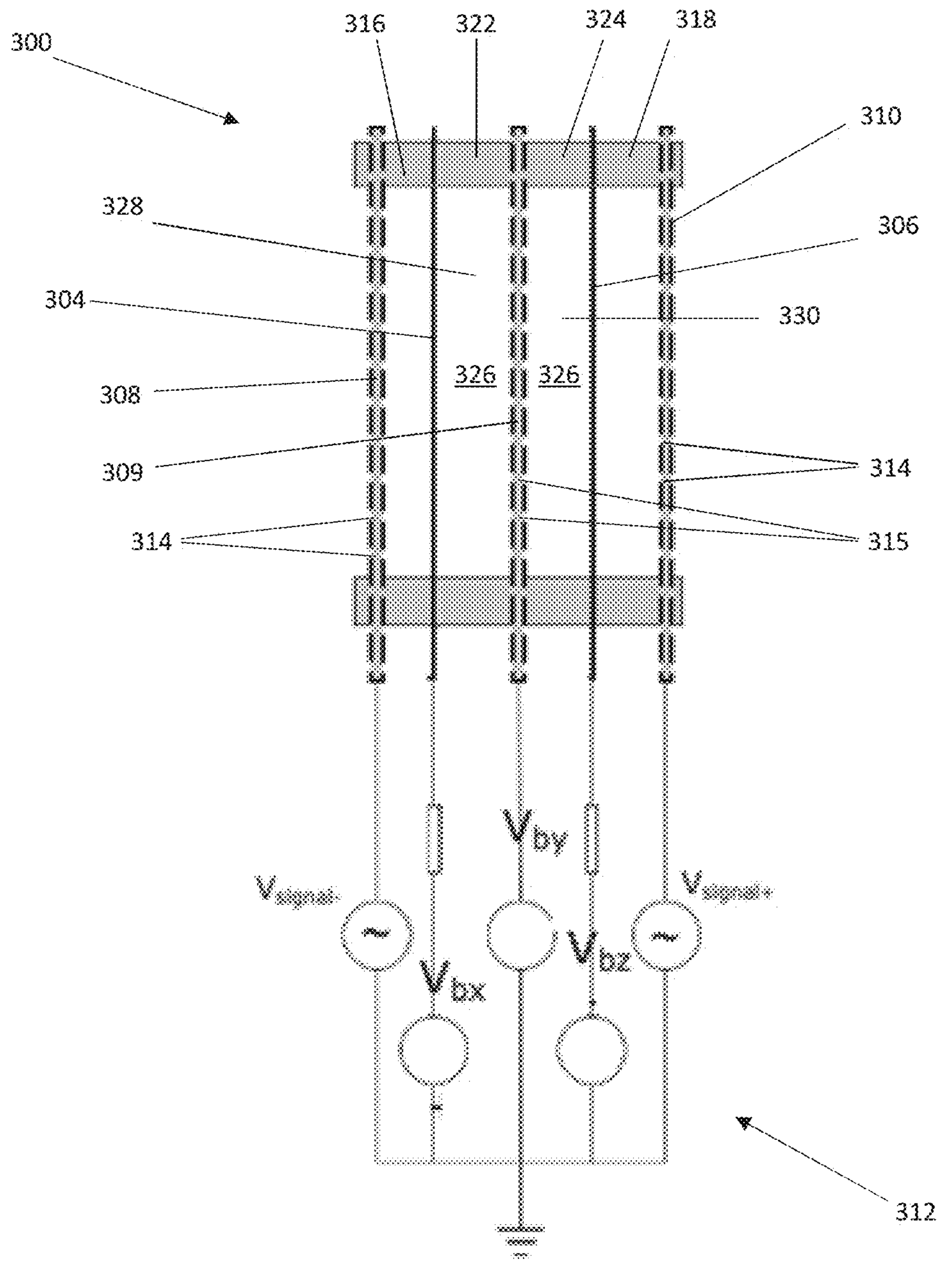
FIG. 3*a* shows a schematic cross-sectional view of a second embodiment of electrostatic transducer in accordance with the present invention.
Figure 3B:
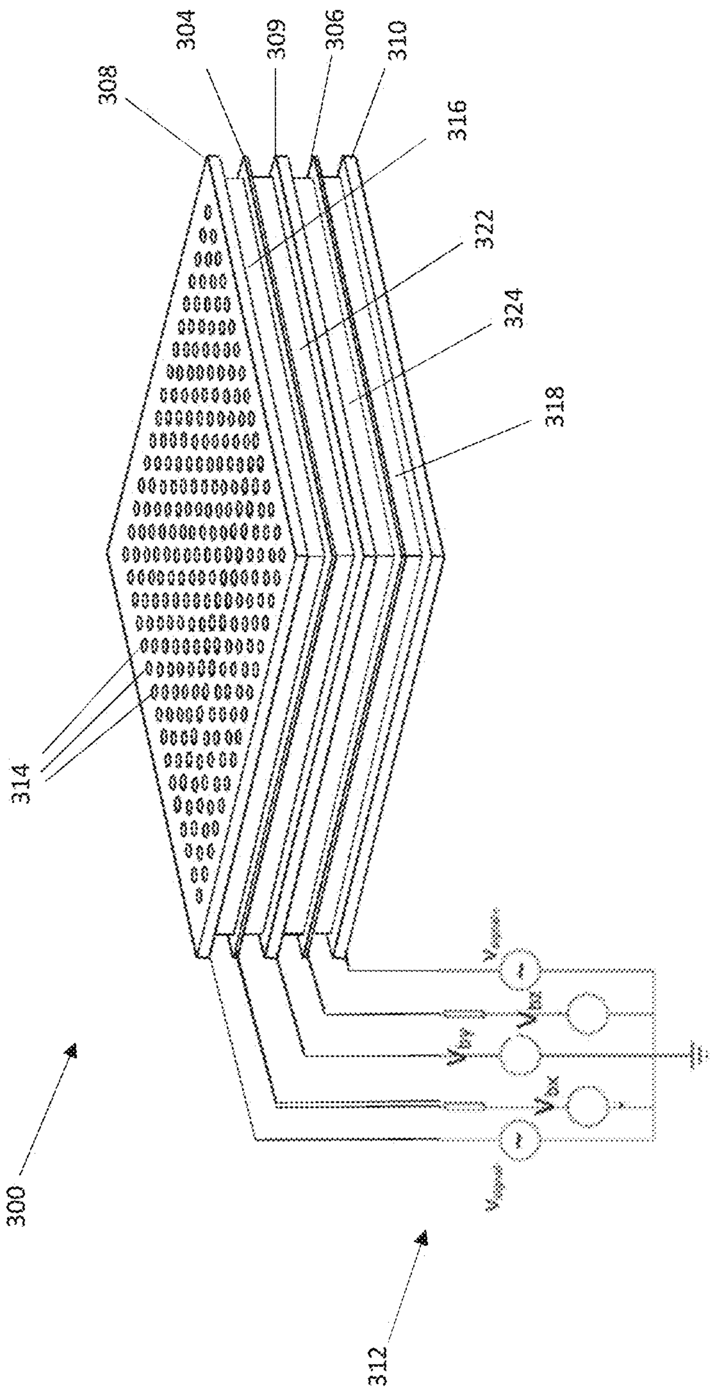
FIG. 3*b* shows a schematic perspective view of the embodiment shown in FIG. 3*a;*

FIGS. 3*a* and 3*b* show a second embodiment of an electrostatic transducer 300 in accordance with the present invention. The electrostatic transducer 300 comprises a layered configuration of membranes 304, 306 and stators 308, 309, 310 (with holes 314, 315) together with a biasing arrangement 312. FIG. 3*a* shows a schematic cross-sectional view of the layered configuration. FIG. 3*b* shows a schematic perspective view of the layered configuration. FIGS. 3*a* and 3*b* are not to scale.

The first and second membranes 304, 306 and the first and second stators 308, 310 of this embodiment have the same structure as the membranes 204, 206 and stators 208, 210 of the first embodiment, including being bonded to first and second spacers 316, 318, which hold the first and second membranes 304, 306 in a spaced relationship relative to the first and second stators 308, 310 respectively. However, in this embodiment, a third stator 309 is provided between the first and second membranes 304, 306. The third stator 309 has the same structure as the first and second stators 308, 310, i.e. it is a metal sheet with an array of holes therein.

Instead of a single third spacer between the first and second membranes 304, 306, there are third and fourth spacers 322, 324. The third and fourth spacers 322, 324 have a similar shape to that shown in FIG. 2*c*, including an unbroken surround and a central hole. The third spacer 322 is positioned between the first membrane 304 and the third stator 309, and is bonded to the first membrane 304 and the third stator 309 around their entire peripheries. The fourth spacer 324 is positioned between the second membrane 306 and the third stator 309, and is bonded to the second membrane 306 and the third stator 309 around their entire peripheries. The first and second membranes 304, 306 together with the third and fourth spacers 322, 324 and the periphery of the third stator 309 enclose a volume of air 326 between the first and second membranes 304, 306, i.e. so that the volume of air is surrounded on all sides without any gaps. It can be seen from FIG. 3*a* that the volume of air comprises two regions 328, 330 that are acoustically connected via the holes 315 in the third spacer 309.

In this example, the spacing between the membranes is 2 mm, with the third stator 309 equidistant from each membrane 304, 306, but other spacings are possible.

In the example embodiment of FIGS. 3*a* and 3*b*, the first and second membranes 304, 306 are electrically isolated from each other and a biasing arrangement 312 provides D.C. biases Va, Vb and Vc respectively to the first membrane 304, the third stator 309, and the second membrane 310. The biasing arrangement 312 also provides a varying voltage to the first and second stators 308, 310. The voltage provided to each of the first and second stators 308, 310 includes a bias offset (V1 for the first stator 308 and V2 for the second stator 310) and a varying component V(t) corresponding to the audio signal to be reproduced. The varying component has opposite polarity for each stator 308, 310, so that as the voltage V(t) varies, the three stators 308, 309, 310 cooperate to push and pull the biased membranes 304, 306 to generate acoustic waves corresponding to the audio signal.

As the membranes vibrate in response to the applied voltages, the enclosed volume of air 326 provides the advantages discussed above with reference to the first embodiment, i.e. helping to enhance the low frequencies and dampen the high frequencies in the transducer response.

In the example of FIGS. 3*a* and 3*b*, the first and second membranes 304, 306 have the same structure and configuration as the membranes 204, 206 described above with reference to FIGS. 2*a* and 2*b*, i.e. they are formed from the same materials and have the same dimensions as each other, but are mounted in the layered configuration under different tensile stresses, so that the first membrane 304 has a higher effective compliance than the second membrane 306.

As discussed above, the provision of two membranes with different effective compliances alters the frequency response of the transducer compared with two membranes having the same effective compliance. As the resonance characteristics depend on the membrane's effective compliance, providing two membranes with different effective compliances combines the resonant characteristics of both membranes into a single frequency response, which is generally flatter than the frequency response of a transducer with a single membrane or with two membranes with the same effective compliance.

In addition, as mentioned above, providing two membranes with an enclosed volume of air between them modifies the acoustic impedance of the membranes such that, as a composite vibrating element, they have a high effective mass at low frequencies and increased damping at higher frequencies. This enhances the lower frequencies while flattening the higher frequencies in the transducer frequency response, giving a flatter frequency response overall.

Figure 4A:
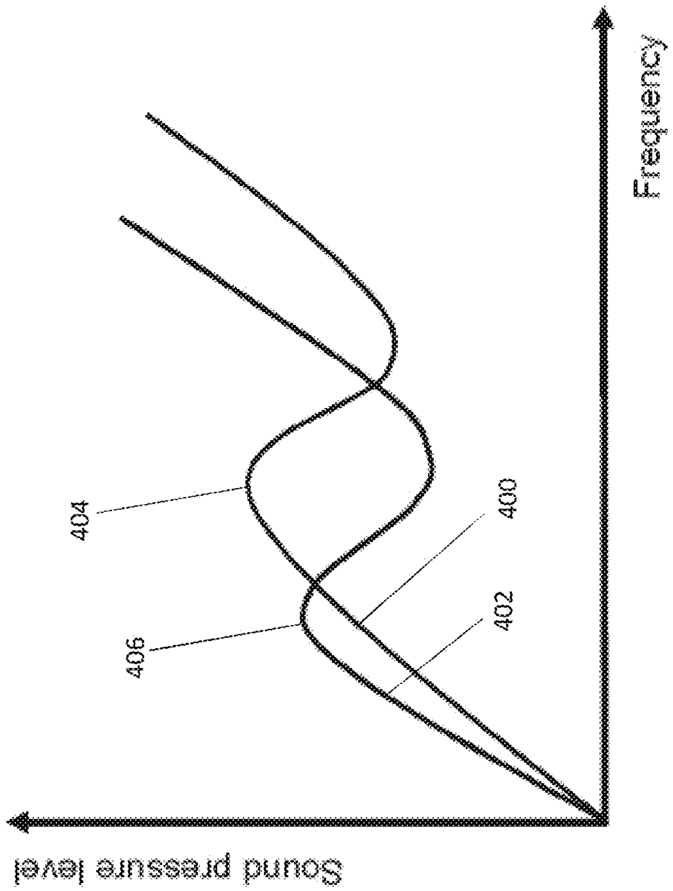
FIG. 4*a* shows an illustrative sketch of the respective frequency responses of two individual transducers each manufactured with a single membrane, where the membrane in each transducer has a different effective compliance.
Figure 4B:
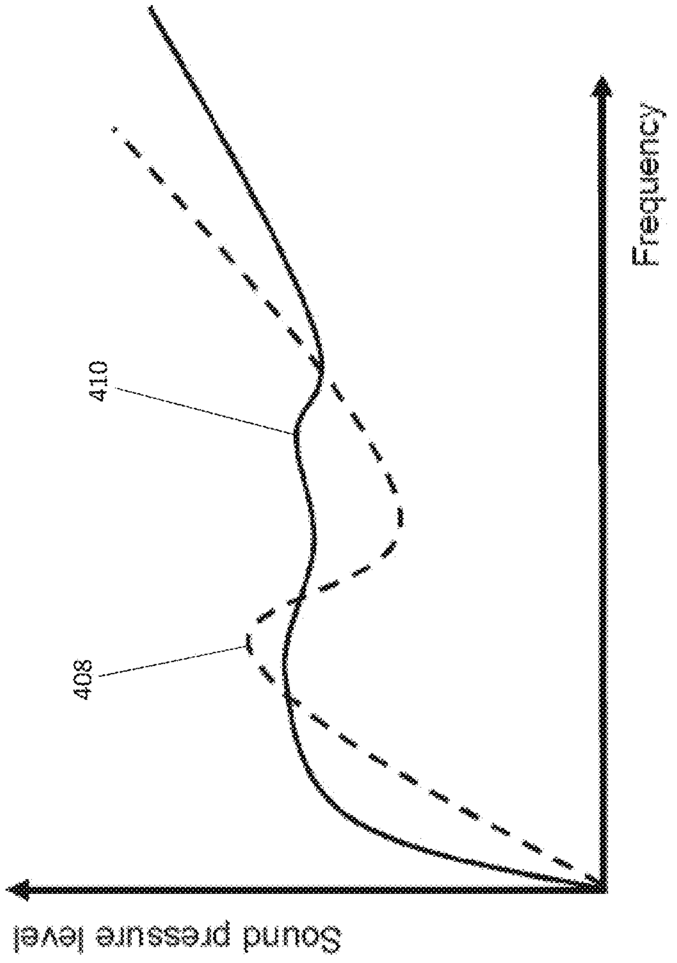
FIG. 4*b* shows an illustrative sketch of the respective frequency responses of a prior art transducer and a transducer in accordance with the present invention.

FIGS. 4*a* and 4*b* provide an illustrative indication of the typical changes observed in the frequency response for a transducer such as those described with reference to FIGS. 2*a*, 2*b*, 3*a* and 3*b* above, compared with known arrangements.

FIG. 4*a* shows an illustrative sketch of the frequency responses 400, 402 of two transducers manufactured with a single membrane, where the membrane in each transducer has a different effective compliance. It can be seen that in FIG. 4*a*, each transducer has a relatively low response at low frequencies, a resonant peak 404, 406 (which depends on the membrane compliance) and after the peak, a gradual increase with frequency. The frequency response 402 of the membrane with the higher effective compliance has a resonant peak 406 that is shifted downward in frequency relative to the resonant peak 404 of the frequency response 400 of the membrane with the lower effective compliance.

FIG. 4*b* shows an illustrative sketch of the frequency response of a two-membrane transducer without sealing to enclosure a volume of air, and wherein the membranes have the same compliance (dotted line 408) and the frequency response of a two-membrane transducer with sealing and different membrane effective compliances, such as described with reference to FIGS. 2*a*, 2*b*, 3*a* and 3*b* above (solid line 410).

It can be seen from FIG. 4*b* that when two such different membranes are provided in one transducer the combination of the two different resonant peaks flattens the frequency response overall. It can also be seen that further flattening is created by the enhanced lower frequencies and damped higher frequencies, which results from providing two membranes in the same transducer with an enclosed air volume between them. A flatter frequency response is desirable because the transducer will reproduce the audio signal with higher fidelity.

Although only two embodiments have been described, it will be appreciated that these embodiments are exemplary only and do not limit the scope of the invention, which is defined by the claims.

The invention claimed is:

1. An electrostatic transducer comprising:

first and second flexible conductive membranes; and first and second conductive stators;

wherein the first and second flexible conductive membranes and the first and second conductive stators are assembled in a layered configuration with the membranes between the stators and with enclosed volumes of air between the first and second membranes;

wherein the enclosed volumes of air do not permit air to move freely in or out of the volumes in a way that transmits an acoustic wave;

wherein the first and second membranes are mounted in the transducer with a spacer between them, wherein the first and second membranes together with the spacer enclose the volumes of air;

wherein the spacer comprises a layer of material with apertures separated by walls and each aperture defines a respective one of the volumes of air that is sealed in by the membranes;

wherein the spacer is bonded to the first and second membranes to seal the air inside the enclosed volumes;

wherein the spacer has a hexagonal lattice shape; and wherein the electrostatic transducer is configured to apply an electrical potential which gives rise to an electrostatic force between the membranes and the stators that causes the membranes to move relative to the stators.

2. The electrostatic transducer as claimed in claim 1, wherein a spacing between the first and second membranes is at least 5 μm.

3. The electrostatic transducer as claimed in claim 1, wherein the first and second membranes are electrically coupled.

4. The electrostatic transducer as claimed in claim 1, wherein the transducer further comprises one or more further membranes between the first and second stators.

5. The electrostatic transducer as claimed in claim 1, wherein at least one of the first stator, the second stator and a further stator comprises an insulating coating on one or more surfaces facing the membranes.

6. The electrostatic transducer as claimed in claim 1, wherein the first and second flexible conductive membranes have respective first and second effective compliances, wherein the first effective compliance is at least 10% greater than the second effective compliance.

7. A method of manufacturing an electrostatic transducer, the method comprising:

providing first and second flexible conductive membranes and first and second conductive stators;

assembling the first and second flexible conductive membranes and the first and second conductive stators in a layered configuration with the membranes between the stators and with enclosed volumes of air between the first and second membranes; and arranging the electrostatic transducer such that the electrostatic transducer is configured to apply an electrical potential which gives rise to an electrostatic force between the membranes and the stators that causes the membranes to move relative to the stators, wherein the enclosed volumes of air do not permit air to move freely in or out of the volumes in a way that transmits an acoustic wave;

wherein the first and second membranes are mounted in the transducer with a spacer between them, wherein the first and second membranes together with the spacer enclose the volumes of air;

wherein the spacer comprises a layer of material with apertures separated by walls and each aperture defines a respective one of the volumes of air that is sealed in by the membranes;

wherein the spacer is bonded to the first and second membranes to seal the air inside the enclosed volumes;

wherein the spacer has a hexagonal lattice shape.

8. A method of manufacturing the electrostatic transducer of claim 1, the method comprising:

providing the first and second flexible conductive membranes and the first and second conductive stators;

assembling the first and second flexible conductive membranes and the first and second conductive stators in the layered configuration with the membranes between the stators and with the enclosed volume of air sealed between the first and second membranes; and arranging the electrostatic transducer such that the electrostatic transducer is configured to apply the electrical potential which gives rise to the electrostatic force between the membranes and the stators that causes the membranes to move relative to the stators.

* * * * *